(12) United States Patent
Cho et al.

(10) Patent No.: US 7,903,731 B2
(45) Date of Patent: Mar. 8, 2011

(54) METHODS AND TRANSCODERS THAT ESTIMATE AN OUTPUT MACROBLOCK AND MOTION VECTOR FOR VIDEO TRANSCODING

(75) Inventors: Jin-Soo Cho, Gyeonggi-do (KR); Jong-Woo Bae, Seoul (KR); Dong-Wan Seo, Seoul (KR); Yoon-Sik Choe, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1560 days.

(21) Appl. No.: 11/238,567

(22) Filed: Sep. 29, 2005

(65) Prior Publication Data
US 2006/0072665 A1    Apr. 6, 2006

(30) Foreign Application Priority Data
Oct. 2, 2004  (KR) .................. 10-2004-0078529

(51) Int. Cl.
*H04N 7/12* (2006.01)

(52) U.S. Cl. .......... 375/240.03; 375/240.16; 375/240.12; 375/240.02; 375/240.01; 382/236

(58) Field of Classification Search ................ 375/240
See application file for complete search history.

(56) References Cited

U.S. PATENT DOCUMENTS

| | | | |
|---|---|---|---|
| 7,245,661 B2 * | 7/2007 | Kim et al. | 375/240.16 |
| 2003/0133512 A1 | 7/2003 | Moni et al. | 375/246 |
| 2003/0206590 A1 * | 11/2003 | Krishnamachari | 375/240.16 |

FOREIGN PATENT DOCUMENTS

| | | |
|---|---|---|
| KR | 1020020057525 | 7/2002 |
| KR | 1020030050387 | 6/2003 |

* cited by examiner

*Primary Examiner* — Samir A Ahmed
*Assistant Examiner* — Ruiping Li
(74) *Attorney, Agent, or Firm* — Myers Bigel Sibley & Sajovec, P.A.

(57) ABSTRACT

Methods and transcoders are disclosed for video transcoding input macroblocks to an output macroblock. One of the methods estimates an output macroblock mode for the video transcoding. A spatial weight is determined based on size of overlapping areas of each of the input macroblocks with a correlation area that is correlated with the output macroblock. A discrete cosine transform (DCT) weight is determined based on a number of zero DCT coefficients of each of the input macroblocks that overlap the correlation area. The output macroblock mode is estimated based on the spatial weight and the DCT weight.

2 Claims, 7 Drawing Sheets

INPUT MACROBLOCKS
HDTV

OUTPUT MACROBLOCK
SDTV

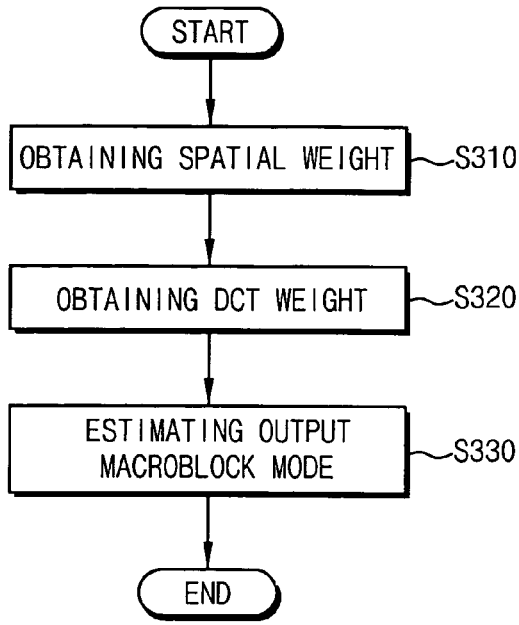
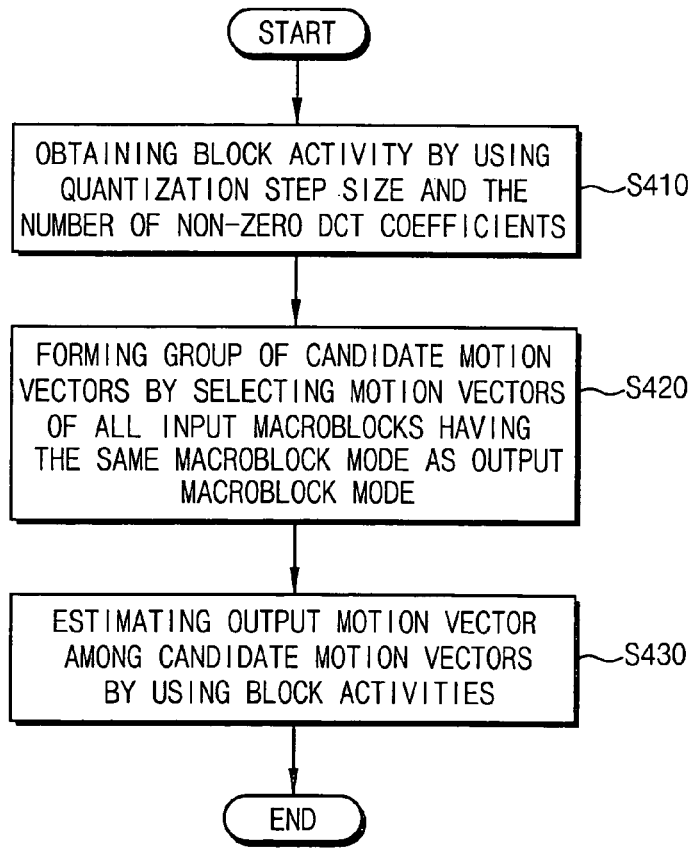

METHODS AND TRANSCODERS THAT ESTIMATE AN OUTPUT MACROBLOCK AND MOTION VECTOR FOR VIDEO TRANSCODING

CROSS-REFERENCE TO RELATED APPLICATIONS

This application claims priority under 35 U.S.C. §119(a) to Korean Patent Application No. 2004-0078529 filed on Oct. 2, 2004 in the Korean Intellectual Property Office, the contents of which are herein incorporated by reference in its entirety.

FIELD OF THE INVENTION

The present invention relates to a video transcoding methods and transcoders and, more particularly, to estimating an output macroblock mode and an output motion vector used for video transcoding.

BACKGROUND OF THE INVENTION

A digital video system may provide significant advantages over an analog video system. For example, the digital video system may transmit or store information without distortion. The digital video system, however, can need a wide bandwidth for transmission and significant storage when the video contains a substantial amount of information. The transmission bandwidth and storage requirements of some digital video can present a substantial problem for some video broadcasting media, such as through Internet connections which have limited bandwidths. Many efforts to reduce the bandwidth demands of digital signals, such as video streams, have been made, resulting in the development of compression technologies. One example is the MPEG-2 technology, which was defined by MPEG (Moving Picture Experts Group). MPEG-2 can substantially compress video data by curtailing redundant information in a video stream.

In a typical MPEG encoding process, video signals are sampled and quantized as chrominance elements and luminance elements of digital video pixels. These chrominance elements and luminance elements are stored as macroblock structures. The chrominance elements and the luminance elements stored in a macroblock are transformed to frequency coefficients through Discrete Cosine Transform (Hereinafter referred to as DCT).

The MPEG encoding process focuses on the fact that the human optical system doesn't sense very well high-frequency elements of the variations of the chrominance elements and the luminance elements. Therefore, the high frequency DCT coefficients are relatively less precisely quantized. The quantized DCT coefficients are more compressed through a Run-Level Coding (RLC) and a Variable Length Coding (VLC).

The MPEG standards provide an additional compression by a motion compensation method. According to the MPEG standards, there are three types of pictures (of frames), an I-frame, a P-frame, and a B-frame. The I-frame represents an Intra-coded frame and can be reconstructed without a reference frame. Both the P-frame and the B-frame represent inter-coded frames and can be reconstructed with reference frames. For example, both the P-frame and the B-frame include motion vectors indicating motions with respect to a reference frame. The adoption of the motion vectors in MPEG greatly contributes to reducing the required bandwidth, particularly for video streams, because adjacent frames in a video stream are likely to be very similar.

Recently, digital applications using compression methods such as MPEG-2 have been increasing. Transcoding methods, which convert one type of video stream with a particular bit rate into other types of video streams with different bit rates, have been in particular demand due to various applications such as video searching, picture in picture (PIP) functions for video display, video joining, video editing, and converting between bit rates. For example, a JPEG (Joint Photographic Experts Group) type bit stream can be converted into an MPEG bit stream, a DV (Digital Video) format which may be generated as a digital output of a digital camcorder can be converted into an MPEG bit stream, or a high quality HD (High Definition) MPEG bit stream can be converted into a low quality SD (Standard Definition) MPEG bit stream.

Transcoding algorithms can be classified into spatial domain transcoding and DCT domain transcoding. During a transcoding process, a transcoder produces output parameters that it uses to encode a video stream. Output parameter production algorithms focus mainly on classifying a mode of an output macroblock and estimating output motion vectors, which are important to the transcoding process.

When downsizing bit streams, such as converting a high quality HD MPEG bit stream into a low quality SD MPEG bit stream, two types of bit stream downsizing processes that may be used are integer scaling and non-integer scaling.

FIG. 1A is a diagram illustrating a transcoding process with integer scaling. Referring to FIG. 1A, a transcoding process with integer scaling performs a selection of a mode of an output macroblock 120 based on each of input macroblocks 111, 113, 115 and 117, and then estimates a motion vector with a scaling ratio.

FIG. 1B is a diagram illustrating a transcoding process with non-integer scaling. Transcoding with non-integer scaling is frequently used in applications that support different video resolutions.

Referring to FIG. 1B, the transcoding process with non-integer scaling may not obtain the output macroblock mode and the output motion vector as simply as transcoding with integer scaling. Each input macroblock (nine shown), which overlaps with a correlation area 150 correlated with an output macroblock, may respectively have different influences on the output macroblock.

Thus, the non-integer scaling transcoding estimates the output macroblock mode and the output motion vector through rather sophisticated processes.

One typical output macroblock mode estimation algorithm is a GWM (Go-With-Majority) algorithm, which is an estimation method that operates on a number of macroblocks. The GWM algorithm, however, does not consider the significance of the macroblocks, so it may not efficiently estimate the output macroblock mode and which may degrade the performance of a transcoder the transcoding process.

Another estimation algorithm that estimates the overall motion of the input macroblocks is an MVS (Median Vector Selection) algorithm. The MVS algorithm, however, also does not consider the significance of each macroblock, instead it estimates the overall motion of the macroblocks.

Another algorithm is a WMVS (Weighted Median Vector Selection) algorithm, which determines an activity of the macroblocks using non-zero DCT coefficients, and then estimate overall motion of the input macroblocks based on the activity. The WMVS, however, may not efficiently perform the transcoding because the macroblock activity, which is obtained using only the DCT coefficients, doesn't exactly estimate the overall motion of the input macroblocks.

A transcoder and a transcoding method are disclosed in Korean Patent Laid-open Application No. 2003-0050387. The transcoder and the transcoding method estimate the output macroblock mode by adopting a weight value corresponding to the overlapped macro blocks in order to reduce computational requirements without picture deterioration.

It can be difficult to estimate the exact output macroblock mode based only on the weight value corresponding to the overlapped macroblocks. Therefore, a more precise method for estimating the output macroblock mode and the output motion vector for the transcoding would be beneficial.

SUMMARY OF THE INVENTION

Some embodiments of the present invention provide a method of estimating an output macroblock mode for video transcoding input macroblocks to an output macroblock. A spatial weight is determined based on size of overlapping areas of each of the input macroblocks with a correlation area that is correlated with the output macroblock. A discrete cosine transform (DCT) weight is determined based on a number of zero DCT coefficients of each of the input macroblocks that overlap the correlation area. The output macroblock mode is estimated based on the spatial weight and the DCT weight.

In some further embodiments, the output macroblock mode may be estimated by estimating an intra/inter mode of the output macroblock based on the spatial weight and the DCT weight, estimating a frame/field mode of the output macroblock based on the spatial weight and the DCT weight, and estimating a motion prediction mode based on the spatial weight.

Some other embodiments also provide a method of estimating an output motion vector for video transcoding input macroblocks to an output macroblock. A block activity is determined based on a quantization step size and a number of non-zero discrete cosine transform (DCT) coefficients for each of the input macroblocks that overlaps a correlation area that is correlated with the output macroblock. A group of candidate motion vectors is formed by selecting motion vectors from all input macroblocks having the same macroblock mode as the output macroblock mode and that overlap the correlation area. The output motion vector is estimated among the group of candidate motion vectors based on the determined block activities.

In some further embodiments, the determined block activities may be substantially proportional to the number of the non-zero DCT coefficients for each of the input macroblocks that overlaps the correlation area and the quantization step size. The output motion vector may be determined from one of the candidate motion vectors having a smallest sum of distances between a first vector and second vectors. The first vector may be based on a product of a first candidate motion vector that is downscaled according to a spatial resolution downscale ratio and the block activity corresponding to the first candidate motion vector. The second vectors may be based on products of second candidate motion vectors that are downscaled according to the spatial resolution downscale ratio and the block activities corresponding to each of the second candidate motion vectors. The spatial resolution downscale ratio may be defined based on a ratio between an input video format resolution and an output video format resolution.

Yet some other embodiments provide a method of estimating an output motion vector for video transcoding input macroblocks to an output macroblock. A spatial weight is determined based on size of overlapping areas of each of the input macroblocks with a correlation area that is correlated with the output macroblock. A discrete cosine transform (DCT) weight is determined based on a number of non-zero DCT coefficients of each of the input macroblocks that overlap the correlation area. An output macroblock mode is estimated based on the spatial weight and the DCT weight. A block activity is determined based on a quantization step size and the number of non-zero DCT coefficients of each of the input macroblocks that overlap the correlation area. A group of candidate motion vectors is formed by selecting motion vectors from all input macroblocks having the same macroblock mode as the output macroblock mode and that overlap the correlation area. The output motion vector is estimated among the group of candidate motion vectors based on the determined block activities.

In some other embodiments, a transcoder includes a decoder, a downsampler, an information extractor, an encoding parameter estimator, and an encoder. The decoder is configured to decode an input video stream that is encoded by a first format to generate a decoded video stream. The downsampler is configured to downsample the decoded video stream from the decoder to generate a downsampled video stream. The information extractor is configured to extract from the input macroblocks of the downsampled video stream the modes, the input motion vectors information, the DCT coefficients information, and the quantization parameter, and configured to determine overlapping area information representative of size of overlapping areas of each of the input macroblocks with a correlation area that is correlated with an output macroblock. The encoding parameter estimator is configured to determine an output macroblock mode based on the extracted modes of the input macroblocks, the extracted DCT coefficients information and the determined overlapping area information, configured to determine an output motion vector based on the extracted input motion vectors information, the extracted DCT coefficients information and the extracted quantization parameter. The encoder is configured to encode the downsampled video stream from the downsampler with a second format to generate an output video stream responsive to the macroblock mode and the output motion vector determined by the encoding parameter estimator.

In some further embodiments, the first format is a HDTV (High Definition Television) format, and the second format is a SDTV (Standard Definition Television) format.

BRIEF DESCRIPTION OF THE DRAWINGS

FIG. 3 is a flow chart illustrating methods of estimating the output macroblock mode according to some embodiments of the invention.

FIG. 4 is a flow chart illustrating methods of estimating an output motion vector for video transcoding according to some embodiments of the invention.

DESCRIPTION OF EMBODIMENTS OF THE INVENTION

Figure 1A:
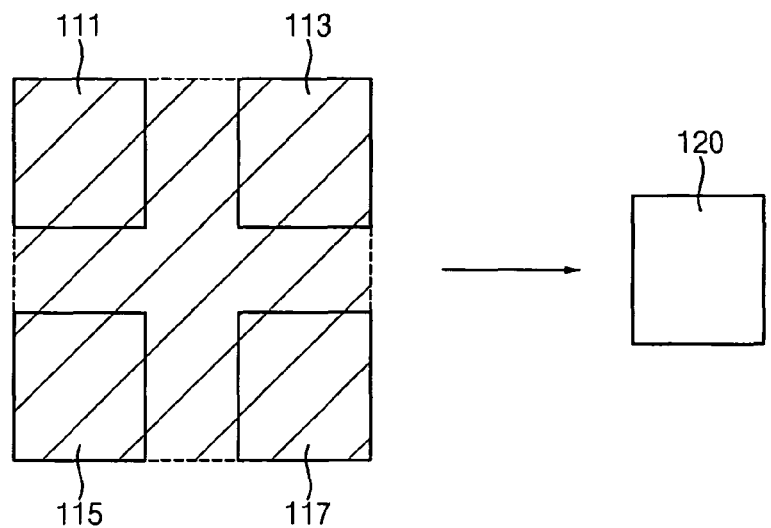
FIG. 1A is a diagram illustrating a transcoding process with integer scaling.
Figure 1B:
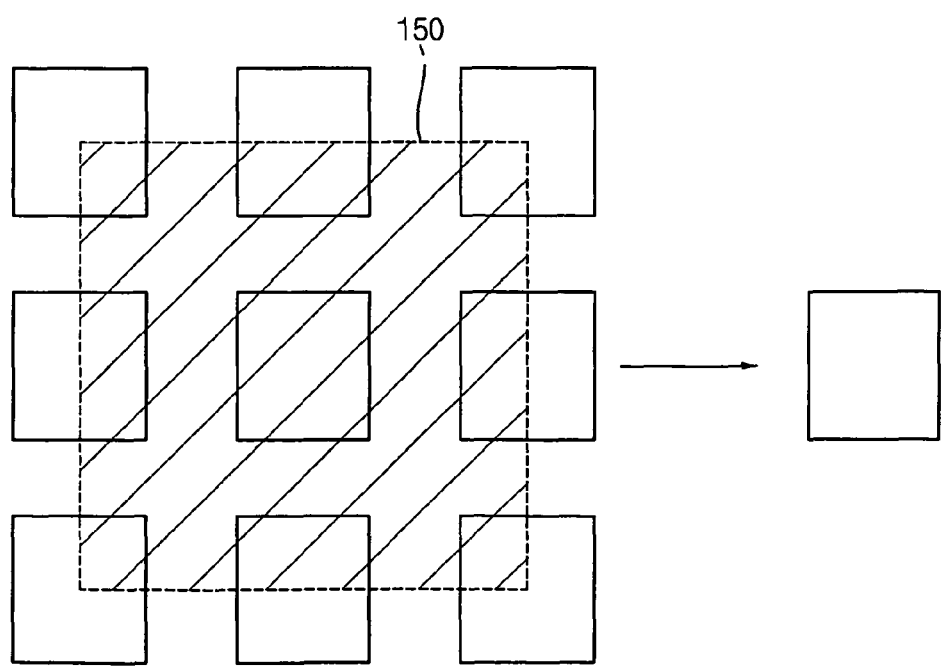
FIG. 1B is a diagram illustrating a transcoding process with non-integer scaling.

Detailed illustrative embodiments of the present invention are disclosed herein. However, specific structural and functional details disclosed herein are merely representative for purposes of describing example embodiments of the present invention. This invention may, however, be embodied in many alternate forms and should not be construed as limited to the embodiments set forth herein.

Accordingly, while the present invention is susceptible to various modifications and alternative forms, specific embodiments thereof are shown by way of example in the drawings and will herein be described in detail. It should be understood, however, that there is no intent to limit the present invention to the particular forms disclosed, but on the contrary, the present invention is to cover all modifications, equivalents, and alternatives falling within the spirit and scope of the present invention as defined by the claims. Like numbers refer to like elements throughout the description of the figures.

It also will be understood that, as used herein, the term "comprising" or "comprises" is open-ended, and includes one or more stated elements, steps and/or functions without precluding one or more unstated elements, steps and/or functions.

Figure 2:
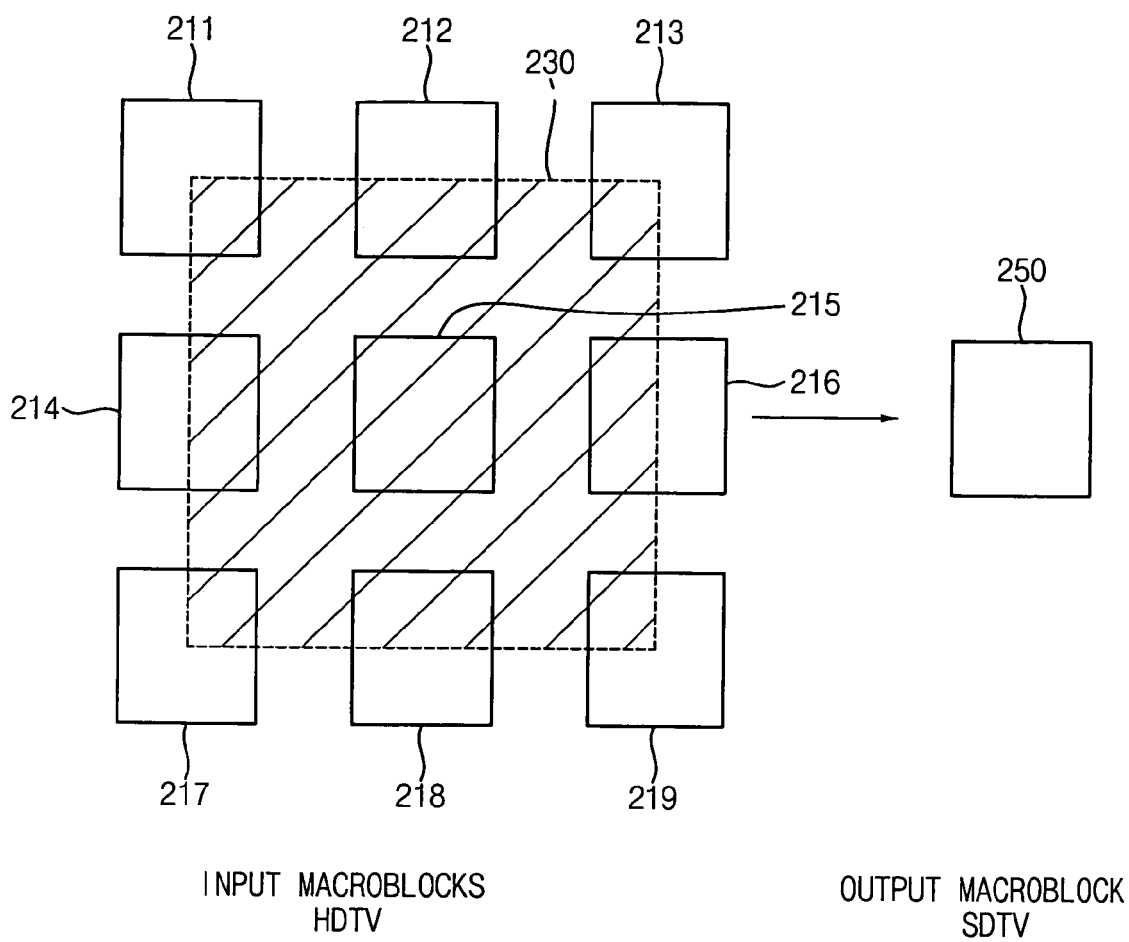
FIG. 2 is a diagram illustrating estimation of an output macroblock mode and an output motion vector for transcoding according to some embodiments of the invention.

FIG. 2 is a diagram illustrating estimation of an output macroblock mode and an output motion vector for transcoding according to some embodiments of the invention.

Referring to FIG. 2, input macroblocks 211 to 219, which overlap with a correlation area 230 correlated to an output macroblock 250, are transcoded into the output macroblock 250. For example, the input macroblocks 211 to 219 may be HDTV (High Definition TV) formatted data and the output macroblock 250 may be SDTV (Standard Definition TV) formatted data. The correlation area 230 is an area mapped onto the output macroblock 250 and is also referred as a mapped block.

A mode of the output macroblock 250 and the output motion vector are estimated from the input macroblocks 211 to 219 in FIG. 2, and then transcoding is performed based on the estimated output macroblock mode and the estimated output motion vector. The accuracy of the estimation of the output macroblock and the output motion vector can significantly affect the transcoding performance.

In some embodiments of the present invention, the output macroblock mode for the transcoding is estimated based on a spatial weight and a DCT weight, and the output motion vector is estimated based on a block activity that is related to the number of non-zero DCT coefficients and a quantization step size.

FIG. 3 is a flow chart illustrating methods of estimating the output macroblock mode according to some embodiments of the present invention.

Referring to FIG. 3, an output macroblock mode estimation method, according to some embodiments of the present invention, begins with obtaining (determining) the spatial weight (step S31).

A spatial weight may be determined based on the size of overlapping area between each of the input macroblocks and a correlation area that is correlated with the output macroblock. For example, the spatial weight may be determined based on the number of pixels within each of the areas of overlap between the input macroblocks and the correlation area.

A DCT weight is obtained (determined) (step S320). The DCT weight may be determined based on a number of zero coefficients of each of the input macroblocks that overlap the correlation area.

For example, the DCT weight may be equal to the number of the zero DCT coefficients divided by the total number of the DCT coefficients. The total number of the DCT coefficients may, for example, be equal to 256.

A zero DCT coefficient can mean that the present picture data has the same motion vectors as the previous picture data and has no quantization noise. Therefore, the macroblock mode may effectively be estimated by weighting the input macroblocks that have a lot of the zero DCT coefficients.

Obtaining the spatial weight (step S310) and obtaining the DCT weight (step S320) may be performed in the exemplar order shown in FIG. 3, or they may be determined in a reverse order or simultaneously.

Next, the output macroblock mode is estimated based on the spatial weight and the DCT weight (step S330).

The output macroblock mode can include an intra/inter mode, a frame/field mode and a motion prediction mode. The motion prediction mode can include a forward prediction mode, a backward prediction mode and a bidirectional prediction mode.

Estimation of the output macroblock mode can include estimation of each of the intra/inter mode, the frame/field mode, and the motion prediction mode. The intra/inter mode may be estimated based on the spatial weight and the DCT weight. The intra/inter mode may be estimated by determining a significance for each of the input macroblocks that overlap the correlation area, and which is proportional to the spatial weight and the DCT weight for each of those input macroblocks. The significances for each group of the macroblocks having the same intra/inter mode are summed. The intra/inter mode may be selected as a mode of the group of the input macroblocks having the largest sum of the input macroblock significances. The input macroblock significances may be a product of the spatial weight and the DCT weight.

For example, when there are nine input macroblocks that overlap a correlation area, the significances of the input macroblocks may be determined by multiplying the spatial weight and the DCT weight for each of the nine input macroblocks. The determined input macroblock significances are added together for the input macroblocks having the same intra/inter mode. The intra/inter mode of the input macroblocks having the largest sum of the significances is selected as the intra/inter mode of the output macroblock mode.

Estimation of the output macroblock mode can further include estimation of the frame/field mode based on the spatial weight and the DCT weight. The frame/field mode may be estimated based on the input macroblock significances in a similar way as for the intra/inter mode.

For example, when there are nine input macroblocks that overlap the correlation area, the significance is determined for each of the input macroblocks. The input macroblock significances are added together for each of the input macroblocks having the same frame/field mode. The frame/field mode of the macroblocks having the largest sum of the significances, with the same frame/field mode, is selected as the frame/field mode of the output macroblock mode.

When the output macroblock mode is the field mode, the frame/field mode estimation may include an estimation of a top field/bottom field mode.

Estimation of the output macroblock mode may include estimation of the motion prediction mode based on the spatial weight. The motion prediction mode may or may not be also estimated based on the DCT weight, in contrast to the estimations of the frame/field mode and the intra/inter mode.

For example, when there are nine input macroblocks that overlap the correlation area, the nine obtained input macroblock significances are added together for each of the input macroblocks having the same motion prediction mode. The motion prediction mode of the macroblocks having the largest sum of the significances, with the same motion prediction mode, is selected as the motion prediction mode of the output macroblock mode.

FIG. 4 is a flow chart illustrating methods of estimating an output motion vector for video transcoding according to some embodiments of the present invention.

Referring to FIG. 4, a block activity is obtained (determined) based on a quantization step size and the number of non-zero DCT for each input macroblock that overlaps the correlation area (step S410).

The block activities may be substantially proportional to the number of the non-zero DCT coefficients for each of the input macroblocks that overlaps the correlation area and a quantization step size. The block activities may alternatively be a product of the number of the non-zero DCT coefficients and the quantization step size.

A group of the candidate motion vectors is formed by gathering motion vectors of all input macroblocks having a same macroblock mode as the output macroblock mode and which overlap the correlation area (step S420).

As will be appreciated, the output macroblock mode may be estimated by methods other than those illustrated in FIG. 3.

Steps S410 and S420 may be performed in the order shown in FIG. 3, or they may be performed in a reverse order or simultaneously.

Next, the output motion vector is estimated among the group of the candidate motion vectors based on the determined block activities (step S430).

The output motion vector can be one of the candidate motion vectors having the smallest sum of distances between a first vector, which is based on a product of a candidate motion vector that is downscaled according to a spatial resolution downscale ratio and the block activity corresponding to the candidate motion vector, and other second vectors that are based on products of other candidate motion vectors downscaled according to the spatial resolution downscale ratio and the block activities corresponding to each of the other candidate motion vectors.

The spatial resolution downscale ratio is defined based on a ratio between the input video format resolution and the output video format resolution. For example, the input video format may be the High Definition TV (HDTV) format and the output video format may be the Standard Definition TV (SDTV) format.

The output motion vector may be estimated as MVi in Equation 1 below when di has a minimum value:

$$d_i = \sum_{j=1, j \neq i}^{N} \|C_i MV'_i - C_j MV'_j\|, \quad <\text{Equation 1}>$$

where N denotes the number of the candidate motion vectors; Ci and Cj denote corresponding block activities; MV'i and MV'j denote the motion vectors MVi and MVj respectively downscaled according to the spatial resolution reduction ratio, and di denotes the sum of distances between the first vector and the second vectors.

In Equation 1, when MVi corresponds to (MVix, MViy) and the resolution reduction ratio corresponds to (1/a, 1/b) after the transcoding, MV'i becomes (MVix/a, MViy/b). When MVj corresponds to (MVjx, MVjy) and the resolution reduction ratio corresponds to (1/a, 1/b) after the transcoding, MV'j becomes (MVjx/a, MVjy/b). The MVi that minimizes di is estimated to be the output motion vector.

Figure 5:
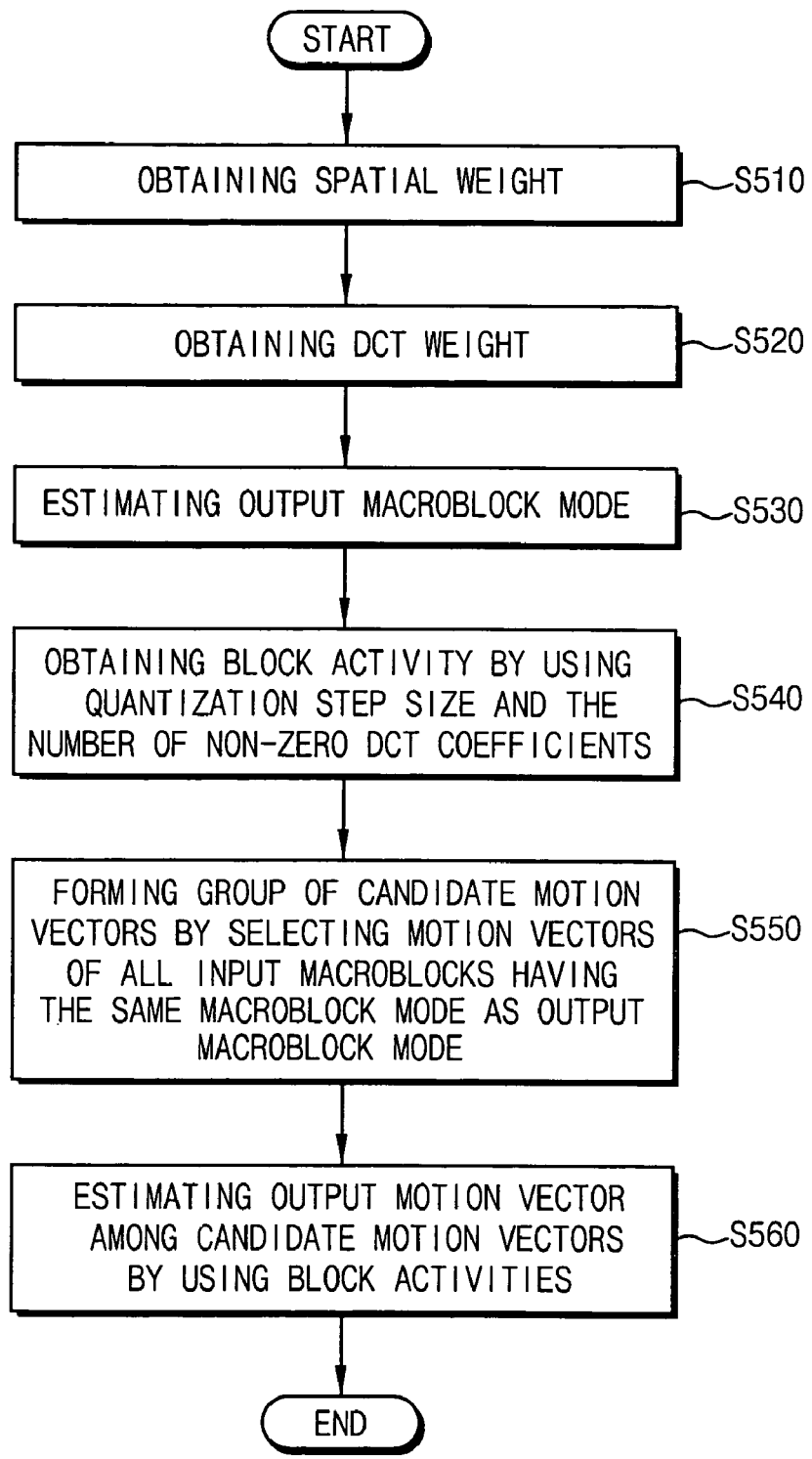
FIG. 5 is a flow chart illustrating methods of estimating the output motion vector according to some embodiments of the invention.

FIG. 5 is a flow chart illustrating methods of estimating the output motion vector according to some embodiments of the present invention.

Referring FIG. 5, the spatial weight is obtained (determined) (step S510). The spatial weight may be proportional to the size of an area of overlap of each of the input macroblocks with the correlation area that is correlated with the output macroblock. The spatial weight may be related to the number of pixels in each of the overlapping areas.

The DCT weight is obtained (determined) at step S520. The DCT weight may be determined based on the number of the zero coefficients of each input macroblock that overlaps the correlation area. The DCT weight may be equal to the number of zero DCT coefficients divided by the total number of DCT coefficients which, for example, may be equal to 256. Alternatively, the DCT weight may be the number of the zero coefficients of each input macroblock that overlaps the correlation area.

A zero DCT coefficient can indicate that the present picture data has the same motion vectors as the previous picture data and has no quantization noise. Therefore, the macroblock mode may effectively be estimated by weighting the input macroblocks that have a lot of zero DCT coefficients.

Determination of the spatial weight (step S510) and the DCT weight (step S520) may be performed in order as shown in FIG. 5, or they may be performed in a reverse order or simultaneously.

The output macroblock mode is estimated based on the spatial weight and the DCT weight (S530). The output macroblock mode can include an intra/inter mode, a frame/field mode and a motion prediction mode. The motion prediction mode can include a forward prediction mode, a backward prediction mode and a bidirectional prediction mode.

The intra/inter mode is estimated based on the spatial weight and the DCT weight. The intra/inter mode may be estimated by determining a significance for each of the input macroblocks that overlap the correlation area, and which is proportional to the spatial weight and the DCT weight for each of those input macroblocks. The significances for each group of the macroblocks having the same intra/inter mode are summed. The intra/inter mode may be selected as a mode of the group of the input macroblocks having the largest sum of the input macroblock significances. The input macroblock significances may be a product of the spatial weight and the DCT weight.

For example, when there are nine input macroblocks that overlap a correlation area, the significances of the input macroblocks may be determined by multiplying the spatial weight and the DCT weight for each of the nine input macroblocks. The determined input macroblock significances are added together for the input macroblocks having the same intra/inter mode. The intra/inter mode of the input macroblocks having the largest sum of the significances is selected as the intra/inter mode of the output macroblock mode.

Estimation of the output macroblock mode can further include estimation of the frame/field mode based on the spatial weight and the DCT weight. The frame/field mode may be estimated based on the input macroblock significances in a similar way as for the intra/inter mode.

For example, when there are nine input macroblocks that overlap the correlation area, the significance is determined for each of the input macroblocks. The input macroblock significances are added together for each of the input macroblocks having the same frame/field mode. The frame/field mode of the macroblocks having the largest sum of the significances, with the same frame/field mode, is selected as the frame/field mode of the output macroblock mode.

When the output macroblock mode is the field mode, the frame/field mode estimation may include an estimation of a top field/bottom field mode.

Estimation of the output macroblock mode may include estimation of the motion prediction mode based on the spatial weight. The motion prediction mode may or may not be also estimated based on the DCT weight, in contrast to the estimations of the frame/field mode and the intra/inter mode.

For example, when there are nine input macroblocks that overlap the correlation area, the nine obtained input macroblock significances are added together for each of the input macroblocks having the same motion prediction mode. The motion prediction mode of the macroblocks having the largest sum of the significances, with the same motion prediction mode, is selected as the motion prediction mode of the output macroblock mode.

A block activity is obtained (determined) based on a quantization step size and the number of non-zero DCT for each input macroblock that overlaps the correlation area (step S540).

The block activities may be substantially proportional to the number of the non-zero DCT coefficients for each of the input macroblocks that overlaps the correlation area and a quantization step size. The block activities may alternatively be a product of the number of the non-zero DCT coefficients and the quantization step size.

A group of the candidate motion vectors is formed by gathering motion vectors of all input macroblocks having a same macroblock mode as the output macroblock mode and which overlap the correlation area (step S550). The steps S540 and S550 may be performed in order as shown in FIG. 5, or they may be performed in a reverse order or simultaneously.

Next, the output motion vector is estimated among the group of the candidate motion vectors based on the determined block activities (step S560).

The output motion vector can be a candidate motion vector having the smallest sum of distances between a vector, which is based on a product of a candidate motion vector that is downscaled according to a spatial resolution downscale ratio and the block activities corresponding to the candidate motion vector, and other vectors that are based on products of other candidate motion vectors downscaled according to the spatial resolution downscale ratio and the block activities corresponding to each of the other candidate motion vectors.

The spatial resolution downscale ratio is defined based on a ratio between the input video format resolution and the output video format resolution. For example, the input video format may be the High Definition TV (HDTV) format and the output video format may be the Standard Definition TV (SDTV) format.

The motion vector estimation may be determined based on Equation 1 as described above.

Figure 6:
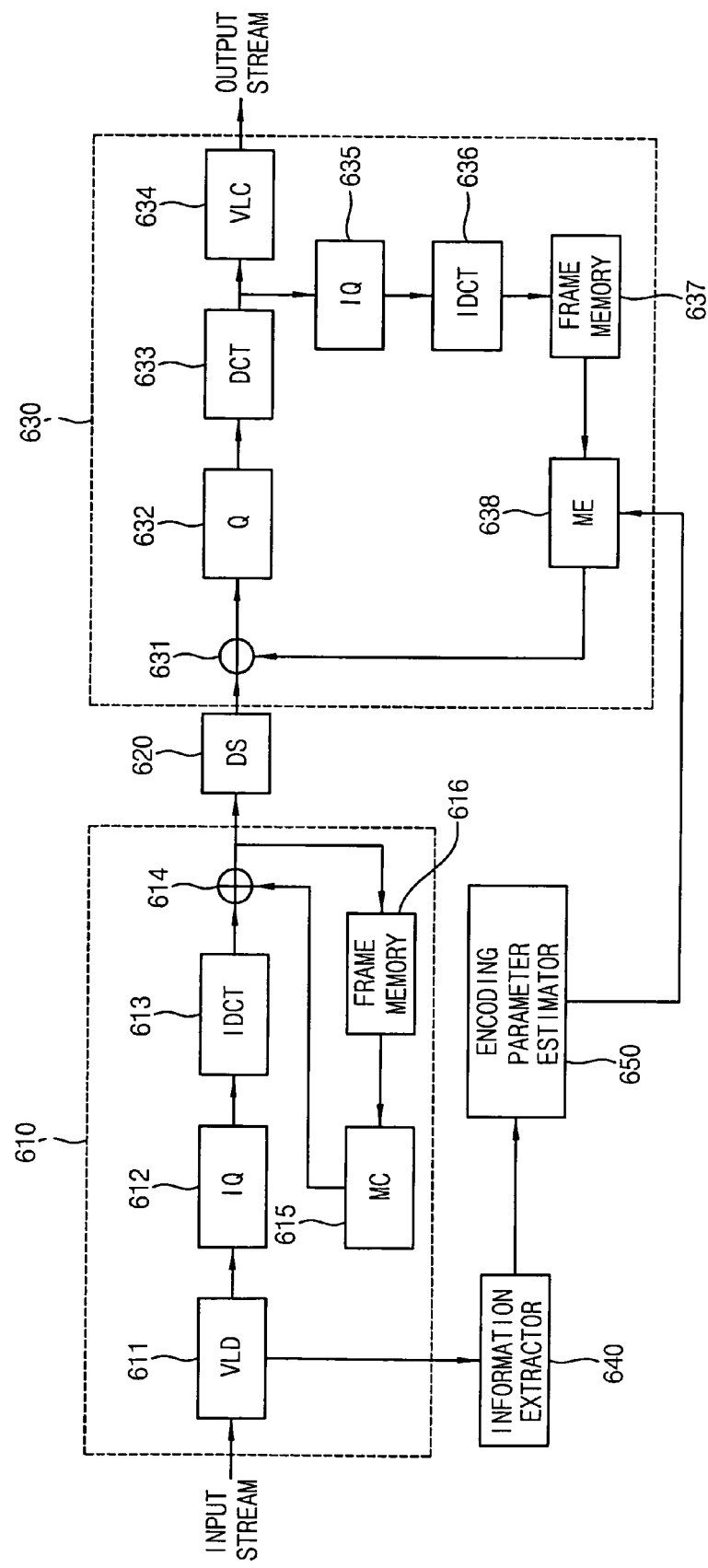
FIG. 6 is a block diagram illustrating a transcoder according to some embodiments of the invention.

FIG. 6 is a block diagram illustrating a transcoder that is configured according to some embodiments of the present invention. The transcoder includes a decoder 610, a downsampler 620, an encoder 630, an information extractor 640 and an encoding parameter estimator 650. The decoder 610 decodes an input stream, which is coded by a first format. The first format may be, for example, an HDTV format. The decoder 610 includes a Variable Length Decoding (VLD) circuit 611, an Inverse Quantization (IQ) circuit 612, an Inverse Discrete Cosine Transform (IDCT) circuit 613, an adder 614, a Motion Compensation (MC) circuit 615, and a frame memory 616.

The VLD circuit 611 performs a variable length decoding process on the input video stream. The IQ circuit 612 performs an inverse quantization on the variable length decoded input video stream to generate inverse quantized data. The IDCT circuit 613 performs an inverse discrete cosine transform process on the inverse quantized data. The MC circuit 615 performs a motion compensation process based on an output of the frame memory 616, and outputs the motion compensated data to the adder 614. The adder 614 adds the inverse discrete cosine transformed data and the motion compensated data. The frame memory 616 stores the output of the adder 614.

The downsampler (DS) 620 performs a downsampling process on an output of the decoder 610.

The encoder 630 generates an output stream after encoding the output of the downsampler 620 with a second format. The second format may be, for example, an SDTV format.

The encoder 630 includes a subtracter 631, a Discrete Cosine Transform (DCT) circuit 632, a Quantization (Q) circuit 633, a Variable Length Coding (VLC) circuit 634, an Inverse Quantization (IQ) circuit 635, an Inverse Discrete Cosine Transform (IDCT) circuit 636, a frame memory 637, and a Motion Estimation (ME) circuit 638.

The subtracter 631 subtracts a motion estimated data from the output of the downsampler 620. The DCT circuit 632 performs a discrete cosine transform process on an output of the subtracter 631. The quantization circuit 633 quantizes the discrete cosine transformed data. The VLC circuit 634 performs a variable length coding process on the quantized data to generate an output video stream. The IQ circuit 635 performs an inverse quantization process on the quantized data. The IDCT circuit 636 performs an inverse discrete cosine transform process on the inverse quantized data. The frame memory 637 stores an output of the IDCT circuit 636. The ME circuit 638 performs a motion estimation process based on an output of the frame memory 637 and generates a motion estimated data.

While the decoder 610 decodes the input stream, the information extractor 640 extracts modes of input macroblocks, input motion vectors information, DCT coefficients information, a quantization parameter and information of an overlapping area where the input macroblocks overlap with a correlation area correlated with output macroblocks. The information is used or generated in the decoder 610 during the decode process. The information extractor 640 may be configured in hardware integrated circuit(s) by, for example, allocating additional output pins, and/or it may be configured in software.

The information extractor 640 may also be configured to extract other information from the input video stream. The information extractor 640 may extract information from the VLD circuit 611 in the decoder 610.

The encoding parameter estimator 650 estimates the output macroblock mode based on the input macroblock mode, the DCT coefficients information and information about the area of overlap between the input macroblocks with the correlation area. The encoding parameter estimator 650 estimates the output motion vector based on the input motion vector information, the DCT coefficients information and the quantization parameters. The encoding parameter estimator 650 outputs the macroblock mode and the output motion vectors to the encoder 630. The encoder 630 may efficiently perform an encoding process with the estimated output macroblock modes and the estimated output motion vectors.

The output macroblock modes and the output motion vectors estimated by the encoding parameter estimator 650 may be outputted to the ME circuit 638 in the encoder 630, to both the ME circuit 638 and VLC circuit 634, or to other portions of the encoder 630 in FIG. 6.

Figure 7:
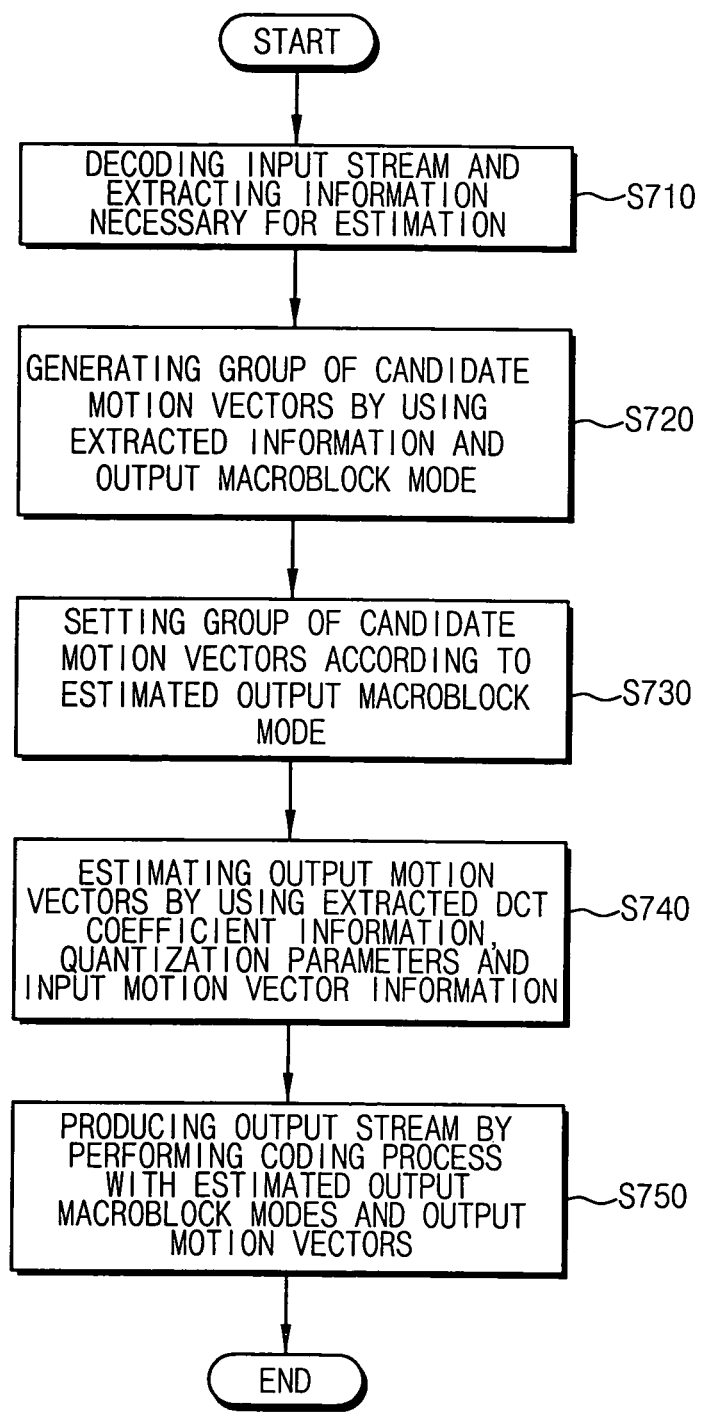
FIG. 7 is a flow chart illustrating operations of the transcoder in FIG. 6 according to some embodiments of the present invention.

FIG. 7 is a flow chart illustrating various operations that may be carried out by the transcoder in FIG. 6.

Referring to FIG. 7, the transcoder in FIG. 6 decodes an input video stream and extracts (step S710) modes of input macroblocks, input motion vector information, DCT coefficients information, and a quantization parameter. The transcoder is configured to determine overlapping area information. The input macroblock modes may represent, for example, an intra/inter mode, a frame/field mode and/or a prediction direction mode of the input macroblocks. The input motion vector information indicates information about the motion vectors of the input macroblocks. The DCT coefficient information can indicate the number of zero DCT coefficients and the number of non-zero DCT coefficients in each macroblock. The overlapping area information can indicate size of overlapping areas of the input macroblocks with a correlation area that is correlated with output macroblocks, and may indicate a number of pixels within the overlapped areas. The quantization parameter can indicate the quantization step size.

The transcoder in FIG. 6 generates a group of candidate motion vectors based on the extracted information and a mode of the output macroblock (step S720).

The estimation of the output macroblock mode can be carried out as was described above for steps S510 to S530 based on the input macroblock mode, the DCT coefficients information and the overlapping area information.

The transcoder in FIG. 6 sets a group of candidate motion vectors by selecting the input motion vectors, which have the same mode as the estimated output macroblock mode (step S730).

The transcoder in FIG. 6 estimates the output motion vectors based on the extracted DCT coefficient information, the quantization parameters and the input motion vector information (step S740). The estimation of the output motion vectors may be carried out as was described above for step S560 in FIG. 5 based on the output macroblock mode estimated during step S720. The estimation of the output motion vectors may be performed by the block activities based on the non-zero DCT coefficients and the quantization step size.

The transcoder in FIG. 6 produces an output video stream by carrying out the encoding process with the estimated output macroblock modes and the output motion vectors (step S750).

Two or more of the steps shown in the flow chart in FIG. 7 may be performed in the order shown in FIG. 7, in a reverse order, or simultaneously.

Figure 8:
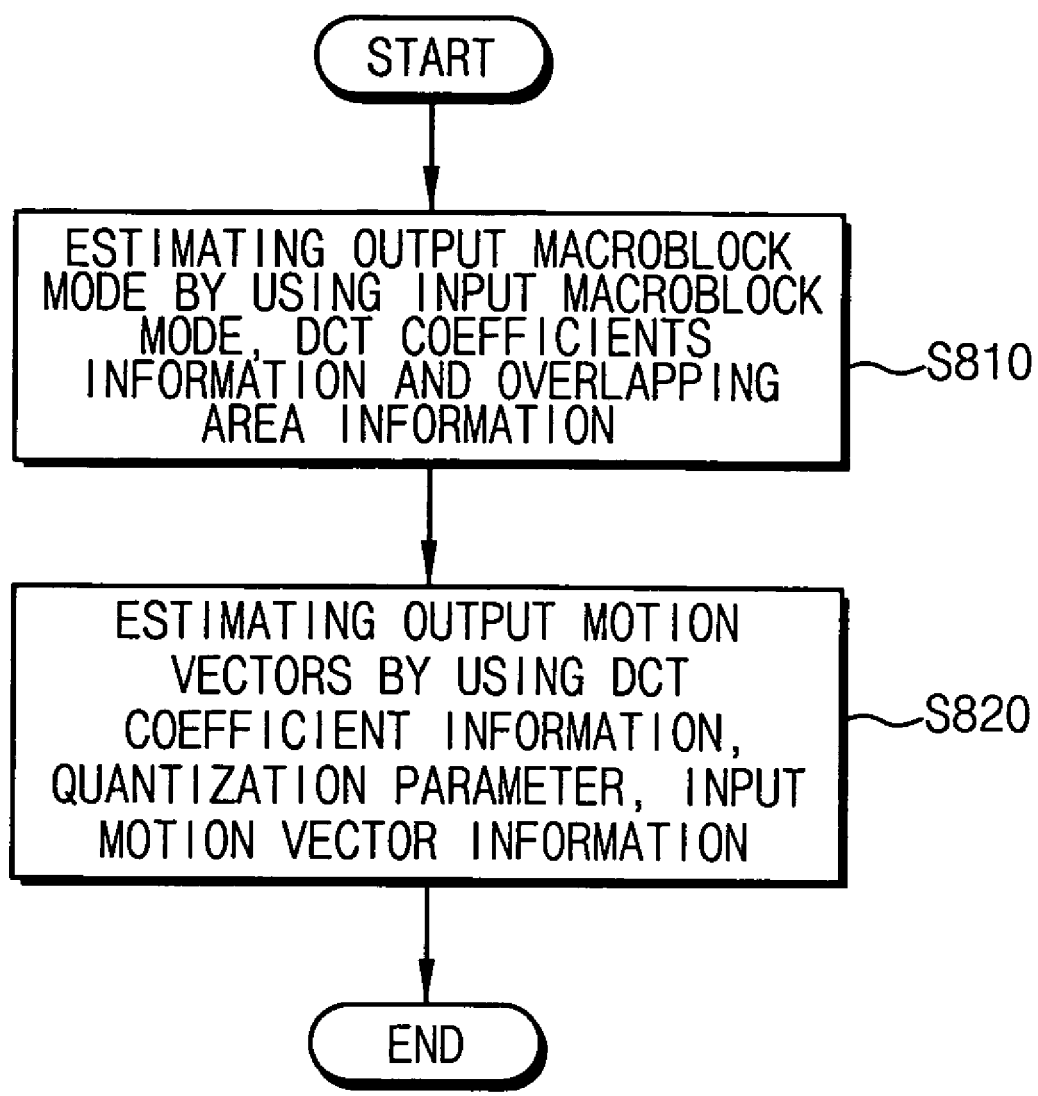
FIG. 8 is a flow chart illustrating operations of the encoding parameter estimator in FIG. 6 according to some embodiments of the present invention.

FIG. 8 is a flow chart illustrating operations that may be carried out by the encoding parameter estimator in FIG. 6. Referring to FIG. 8, the encoding parameter estimator estimates the output macroblock mode based on the input macroblock mode, the DCT coefficients information and the overlapping area information extracted by the information extractor (step S810). The estimation of the output macroblock mode may be performed as described above with regard to steps S510 to S530 in FIG. 5.

The spatial weight, which is related to the overlapping area, may be determined from the overlapping area information. The DCT weight may be determined by the number of the zero DCT coefficients from the DCT coefficient information.

The encoding parameter estimator estimates the output motion vectors based on the DCT coefficient information, the quantization parameter, the input motion vector information and the estimated output macroblock mode extracted from the information extractor (step S820). The output macroblock mode is estimated in step S810. The output motion vector estimation may be performed as described above with regard to steps S540 to S560 in FIG. 5. The block activities may be determined by the number of the non-zero DCT coefficients from the DCT coefficient information, and by the quantization step size may be determined from the quantization parameter.

The output macroblock mode estimation methods for transcoding as well as the output motion vector estimation methods may be carried out by a computer program and/or in hardware by, for example, a custom integrated circuit that is based on an HDL—(Hardware Description Language) defined by an algorithm of the computer program. The present invention also should not be construed as limited to the embodiments described above. For example, although in some embodiments the motion prediction mode is selected based on only the spatial weight, in some other embodiments motion prediction mode may be selected based on the DCT weight, while the output macroblock mode estimation is carried out based on the spatial weight and the DCT weight. The present invention further should not be construed as limited to the embodiments that use Equation 1.

The estimation methods of the output macroblock mode and the output motion vector and the transcoder described above may, in some embodiments, effectively estimate the output macroblock modes and the output motion vectors without increasing computation load.

Embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A method of estimating an output macroblock mode for video transcoding input macroblocks to an output macroblock, comprising:
   determining a spatial weight based on sizes of overlapping areas of each of the input macroblocks with a correlation area that is correlated with the output macroblock;
   determining a discrete cosine transform (DCT) weight based on a number of zero DCT coefficients of each of the input macroblocks that overlap the correlation area; and
   estimating the output macroblock mode based on the spatial weight and the DCT weight,
   wherein estimating the output macroblock mode comprises:
   estimating an intra/inter mode of the output macroblock based on the spatial weight and the DCT weight;
   estimating a frame/field mode of the output macroblock based on the spatial weight and the DCT weight; and
   estimating a motion prediction mode based on the spatial weight, and
   wherein estimating an intra/inter mode of the output macroblock comprises:

determining a significance for each of the input macroblocks that overlap the correlation area;
summing the significances for a first group of the input macroblocks that have the same intra/inter mode; and
selecting an intra/inter mode of the first group of the input macroblocks having the largest sum of the significances of the first group as the inter/inter mode of the output macroblock, and
wherein estimating a frame/field mode of the output macroblock comprises:
summing the significances for a second group of the input macroblocks having the same frame/field mode; and
selecting a frame/field mode of the second group of the input macroblocks that have the largest sum of the significances of the second group as the frame/field mode of the output macroblock, wherein the significances are substantially proportional to the spatial weight and the DCT weight of each of the input macroblocks that overlap the correlation area.

2. The method of claim 1, wherein estimating a motion prediction mode comprises:
determining spatial weights for each of the input macroblocks that overlap the correlation area;
summing the spatial weights for a third group of the input macroblocks that have the same motion prediction mode; and
selecting a motion prediction mode of the third group of the input macroblocks that have the largest sum of the spatial weights of the third group.

* * * * *